United States Patent
Ohira (10) Patent No.: US 9,832,829 B2
(45) Date of Patent: Nov. 28, 2017

(54) LED DRIVER CIRCUIT

(71) Applicant: Ohira Tech Ltd., Kawasaki-shi (JP)

(72) Inventor: Takayuki Ohira, Kawasaki (JP)

(73) Assignee: Ohira Tech Ltd., Kawasaki-shi (JP)

(*) Notice: Subject to any disclaimer, the term of this patent is extended or adjusted under 35 U.S.C. 154(b) by 0 days.

(21) Appl. No.: 15/028,198

(22) PCT Filed: Oct. 30, 2014

(86) PCT No.: PCT/JP2014/078855
§ 371 (c)(1),
(2) Date: Apr. 8, 2016

(87) PCT Pub. No.: WO2015/064677
PCT Pub. Date: May 7, 2015

(65) Prior Publication Data
US 2016/0255692 A1    Sep. 1, 2016

(30) Foreign Application Priority Data
Nov. 1, 2013 (JP) .................................. 2013-228171

(51) Int. Cl.
*H05B 37/02* (2006.01)
*H05B 33/08* (2006.01)
(Continued)

(52) U.S. Cl.
CPC ....... *H05B 33/0845* (2013.01); *G03B 21/606* (2013.01); *H05B 33/0815* (2013.01); *H05B 33/0848* (2013.01); *G09B 27/00* (2013.01)

(58) Field of Classification Search
CPC ............ H05B 33/0845; H05B 33/0815; H05B 33/0848; G09B 27/00; G03B 21/606
(Continued)

(56) References Cited

U.S. PATENT DOCUMENTS 3,707,786 A * 1/1973 Clark ..................... G09B 27/02
434/286
2006/0022914 A1* 2/2006 Kimura ................ G09G 3/2014
345/76
(Continued)

FOREIGN PATENT DOCUMENTS

JP    2006-054362 A    2/2006
JP    2007-317443 A    12/2007
(Continued)

OTHER PUBLICATIONS

International Preliminary Report on Patentability in International Application No. PCT/JP2014/078855, dated May 12, 2016.
(Continued)

*Primary Examiner* — Douglas W Owens
*Assistant Examiner* — Amy Yang
(74) *Attorney, Agent, or Firm* — Venable LLP; Michael A. Sartori; Miguel A. Lopez (57) ABSTRACT

An LED driver circuit capable of overcoming the issues in that a brightness change is perceived as a stepped change in a very low light amount region or light abruptly goes out by using PWM control and of realizing smooth dimming even at a very low amount of light is provided. In the LED driver circuit, a first circuit including a first resistor and a first power transistor connected in series and a second circuit including a second resistor and a second power transistor connected in series are connected in parallel with each other and are connected to an LED. First and second PWM signal generator circuits drive the first and second power transistors, respectively. When the first and second power transistors are in an on-state, currents flow through the LED via the first and second resistors, respectively, which enable a smooth brightness change even in a low illuminance region.

11 Claims, 4 Drawing Sheets

(51) Int. Cl.
_G03B 21/606_ (2014.01)
_G09B 27/00_ (2006.01)

(58) Field of Classification Search
USPC .................................................. 315/294, 240
See application file for complete search history.

(56) References Cited

U.S. PATENT DOCUMENTS

2009/0066263 A1* 3/2009 Ishii .................. H05B 33/0827
315/291
2010/0300006 A1* 12/2010 Magpuri ................ G03B 37/00
52/8
2012/0256550 A1* 10/2012 Akiyama ........... H05B 33/0824
315/187

FOREIGN PATENT DOCUMENTS

| JP | 2009-054928 A | 3/2009 |
| JP | 2011-171231 A | 9/2011 |
| JP | 2013-519988 A | 5/2013 |
| WO | WO-2011/120855 A1 | 10/2011 |

OTHER PUBLICATIONS

International Search Report in International Application No. PCT/JP2014/078855, dated Jan. 20, 2015.

\* cited by examiner

LED DRIVER CIRCUIT

FIELD OF THE INVENTION

The present invention relates to LED (light-emitting diode) driver circuits for adjusting luminance of an LED, and more specifically to an LED driver circuit suitable for, for example, a light dimmer circuit enabling expression of a subtle change in background brightness on a dome screen at a planetarium without causing an unnatural sensation.

BACKGROUND OF THE INVENTION

Unlike incandescent lamps and electric-discharge lamps, LEDs are readily switched on with a direct-current power supply and have a long lifespan. Recently, blue and white LEDs have been put to practical use. Efficiency of LEDs also has reached a level that is better than efficiency of not only incandescent lamps but also fluorescent lamps. LEDs are increasingly widely used not only as display light sources of indicators or the like but also as ordinary illumination light sources or the like. Constant brightness is sufficient for ordinary illumination, whereas dimming for changing the brightness as desired is desirable for some types of interior illumination, stage illumination, and effects illumination at facilities such as planetariums. Changing the brightness of interior illumination as desired allows people to enjoy a change in atmosphere. At bedtime, dim illumination can substitute a function provided by traditional night light bulbs or the like. Stage illumination not only can express a brightness change corresponding to a scene but also can create various scenes by changing the brightness of light sources of individual colors such as red, green, and blue to control hue and saturation. At planetariums, the color and the brightness of illumination are changed as desired not only to use the illumination as houselights when an audience enters or exits but also to express daytime and nighttime scenes. A subtle change in brightness from daytime to dusk and to nighttime is expressed by changing the brightness of illumination.

To dim an LED, a method of changing drive current, a method based on PWM (pulse width modulation) control, and other methods are used. In general, the method based on PWM control is often used because of simple circuitry. Since the amount of LED light responds to current in 1 ms or less, which is extremely fast, LEDs have a property in which the brightness and the pulse width are directly proportional to each other. This property enables accurate brightness control.

However, in the case where LEDs are used in the aforementioned illumination applications, an issue that is not caused by the hitherto used light sources such as incandescent lamps may occur. The issue is that the brightness change is perceived as a stepped change at low illuminance. In PWM control, a command regarding a pulse width can be numerically given, and the pulse width can be accurately specified using a digital circuit. For example, in the case of a PWM signal of 12-bit resolution, the minimum brightness is 1/4,096. Although this brightness seems extremely low, even this minimum brightness is sufficiently bright for humans because the dynamic range of the human eye for brightness is extremely wide. For example, suppose that the maximum brightness is 500 lx. In this case, the minimum brightness of 1/4,096 is equal to 0.12 lx, which is sufficiently bright to be sensed by eyes. When the brightness is increased by one step, the brightness is equal to 0.24 lx, that is, is steeply doubled. Consequently, the stepped brightness change is visually noticeable.

To address this issue, a solution for increasing the resolution of the PWM signal has been conceived. For example, in the case of 16-bit resolution, the minimum brightness is equal to 0.0076 lx, and a significant improvement is expected. However, increasing the resolution in this manner may cause another issue. Specifically, in the case where PWM control is performed at a brightness at which no flicker is noticeable, for example, at approximately 200 Hz, one period is 5 ms. When control is performed at 16-bit resolution, the minimum pulse width is equal to 5 ms/65,536=76.3 ns. Although this is not a speed that is difficult to handle as a speed of a signal of digital circuits, noise is likely to occur if current for causing an LED to emit light is repeatedly supplied and cut at this speed. Consequently, neighboring electronic devices may be affected by noise or noise suppression may become difficult. In addition, if the speed at a rise or fall of the current waveform changes due to a factor such as external noise, the brightness at the lowest illuminance may vary or a flicker may occur, making the brightness change unpleasant to see.

These issues are overlooked in ordinary illumination applications as requirements therefor are met even if such issues occur. However, particularly in applications in which brightness control at low illuminance is important, for example, illumination at planetariums or the like, a subtle nighttime brightness needs to be reproduced by an illumination device. Thus, the above-described issues hinder the stage effects.

Many proposals such as LED driver circuits including a LED dimmer circuit unit for changing the brightness of an LED by using PWM control have been made. Such driver circuits are used in illumination devices, on-vehicle illumination devices, or the like. However, none of many hitherto proposed LED driver circuits are capable of exerting effects assumed by the inventor of this application. Specific issues will be described by using some related-art literatures regarding configurations that functionally operate in a way similar to that of a configuration of an LED driver circuit proposed by the inventor herein, that is, regarding adjustment of the brightness of an LED by using PWM control.

JP 2007-317443(A) has proposed a circuit that enables continuous dimming from the lower limit to the upper limit of an output without complicating circuitry in an illumination system for which dimming control is performed by controlling on/off of power from a power supply based on a PWM signal. In this illumination system, a PWM signal is supplied to a gate of an FET (field effect transistor) that controls an LED from a microprocessor including a ROM (read-only memory) to control the brightness of the LED. In the case where a pulse-on time of the PWM signal based on a control command is finer than a resolution of the clock of the microprocessor, a plurality of pulses having different on times are combined together to create a combined PWM signal so that the average of the pulse-on times becomes equal to the pulse-on time based on the control command. In this way, the continuous dimming from the lower limit to the upper limit of an output is realized. However, in JP 2007-317443(A), pulse width modulation for a low illuminance region and pulse width modulation for a high illuminance region are not used as control signals in order to increase a dynamic range for a LED brightness change, which is aimed by the present invention. Thus, JP 2007-317443(A) does not aim to smooth the brightness change in the low illuminance region.

JP 2011-171231(A) aims to provide an LED lighting circuit capable of performing dimming control in a range below the lower limit of PWM-based dimming. To this end, the LED lighting circuit includes a step-down chopper circuit that supplies an LED current to an LED light source unit as a result of oscillation control of a switching element, and a dimming control unit that controls the LED current by performing oscillation control of the switching element. The dimming control unit includes an oscillation frequency control unit that controls an oscillation frequency, a PWM control unit that controls a PWM on-duty, and a driver unit that switches on/off the switching element on the basis of the oscillation frequency and the PWM on-duty. Operation details are as follows. In a range in which the dimming degree is at or above the lower limit of PWM-based dimming, the PWM control unit changes the PWM on-duty to perform dimming control. In a range in which the dimming degree is below the lower limit of PWM-based dimming, the PWM on-duty is kept unchanged and the oscillation frequency is set to be higher than that for the lower limit of PWM-based dimming. The brightness of an LED is controlled by inputting a signal to the control terminal of the switching element from the driver unit to which the PWM signal from the PWM control unit and the oscillation frequency controlled by the oscillation frequency control unit are input. As in JP 2007-317443(A), pulse width modulation for a low illuminance region and pulse width modulation for a high illuminance region are not used as control signals, and control for mainly changing a pulse width that is input to a driver that causes flow of a small current in the low illuminance region and for mainly changing a pulse width input to a driver that causes flow of a large current in the other illuminance region is not performed.

An apparatus for generating a drive signal for an illumination device as described in JP 2013-519988(A) aims to provide a concept for driving an LED or an LED spot for an HDTV (high-definition television) camera while making requirements for a drive signal generator for the LED or the LED spot lower than in the related art. To this end, the apparatus according to JP 2013-519988(A) includes a pulse generator that generates a first pulse train in response to a first brightness request for a first brightness and generates a second pulse train in response to a second brightness request for a second brightness. The first pulse train has a first frequency, and the second pulse train has a second frequency different from the first frequency. The second pulse train includes two neighboring pulses of the first pulse train and an additional pulse between the two neighboring pulses. The additional pulse is not included in in the first pulse train. Operation details are as follows. Two pulse trains having different frequencies, the additional pulse being inserted to one of the two pulse trains, are input to drive the LED or the LED spot of the HDTV camera. However, this configuration is different from the configuration of the LED driver circuit proposed by the inventor of this application. In addition, the object is not to address the operation in which a brightness change is perceived as a stepped change in a very low light amount region or light abruptly goes out when the brightness of the LED is changed by using PWM control.

SUMMARY OF THE INVENTION

Aspects of the present invention address various issues described above and aim to provide an LED driver circuit capable of overcoming the issues in that a brightness change is perceived as a stepped change in a very low light amount region or light abruptly goes out when the brightness of an LED is changed by using PWM control and of realizing smooth dimming even at a very low amount of light.

To this end, in accordance with a first aspect of the invention, an LED driver circuit includes at least one driver circuit connected to an LED. The at least one driver circuit includes a plurality of current-limiting circuits for which currents that flow therethrough are certain current set values that are different from one another, and a plurality of pulse width modulation circuits. The LED driver is configured to mainly control a pulse width for a current-limiting circuit having a small current set value, among the plurality of current-limiting circuits, in a low light amount region and mainly control a pulse width for a current-limiting circuit having a large current set value, among the plurality of current-limiting circuits, in a high light amount region, whereby an amount of light of the LED is smoothly changed in a wider dynamic range than in a case of using a single driver circuit.

In accordance with a second aspect of the invention, in the first aspect of the invention, the at least one driver circuit may be a plurality of driver circuits, and each of the plurality of driver circuits may be connected to a corresponding one of LEDs.

In accordance with a third aspect of the invention, in the first aspect of the invention, the at least one driver circuit may be a plurality of driver circuits, and the plurality of driver circuits may be connected in parallel to one another and be connected in common to the LED.

In accordance with a fourth aspect of the invention, in the first aspect of the invention, the current-limiting circuit may be a resister.

In accordance with a fifth aspect of the invention, in the first aspect of the invention, the current-limiting circuit may be a constant-current diode.

In accordance with a sixth aspect of the invention, an LED driver circuit used in an illumination device that illuminates background on a dome screen at a planetarium includes at least one driver circuit connected to an LED. The at least one driver circuit includes a plurality of current-limiting circuits for which currents that flow therethrough are certain current set values that are different from one another, and a plurality of pulse width modulation circuits. The LED driver circuit is configured to mainly control a pulse width for a current-limiting circuit having a small current set value, among the plurality of current-limiting circuits, in a low light amount region and mainly control a pulse width for a current-limiting circuit having a large current set value, among the plurality of current-limiting circuits, in a high light amount region, whereby an amount of light of the LED is smoothly changed in a wider dynamic range than in a case of using a single driver circuit.

In accordance with a seventh aspect of the invention, in the sixth aspect of the invention, the at least one driver circuit may be a plurality of driver circuits, and each of the plurality of driver circuits may be connected to a corresponding one of LEDs.

In accordance with an eighth aspect of the invention, in the sixth aspect of the invention, the at least one driver circuit may be a plurality of driver circuits, and the plurality of driver circuits may be connected in parallel to one another and be connected in common to the LED.

In accordance with a ninth aspect of the invention, in the sixth aspect of the invention, a plurality of the illumination devices may be provided in the vicinity of a periphery of the planetarium.

In accordance with a tenth aspect of the invention, in the sixth aspect of the invention, a brightness of the illumination device may be controlled by manual operation or be automatically controlled by a control system at the planetarium.

In accordance with an eleventh aspect of the invention, in the sixth aspect of the invention, a control system at the planetarium may store a real-time solar altitude, calculate a brightness on the basis of the solar altitude, and send a command input based on the calculated brightness to the illumination device to reproduce a change between daytime and nighttime.

With the configuration above, a change in background brightness on a dome screen can be smoothly expressed if the LED driver circuit according to the aspects of the invention is applied to an illumination device at planetariums.

DESCRIPTION OF THE PREFERRED EMBODIMENTS

Embodiments of the present invention will be described in detail below with reference to the accompanying drawings.

Figure 1:
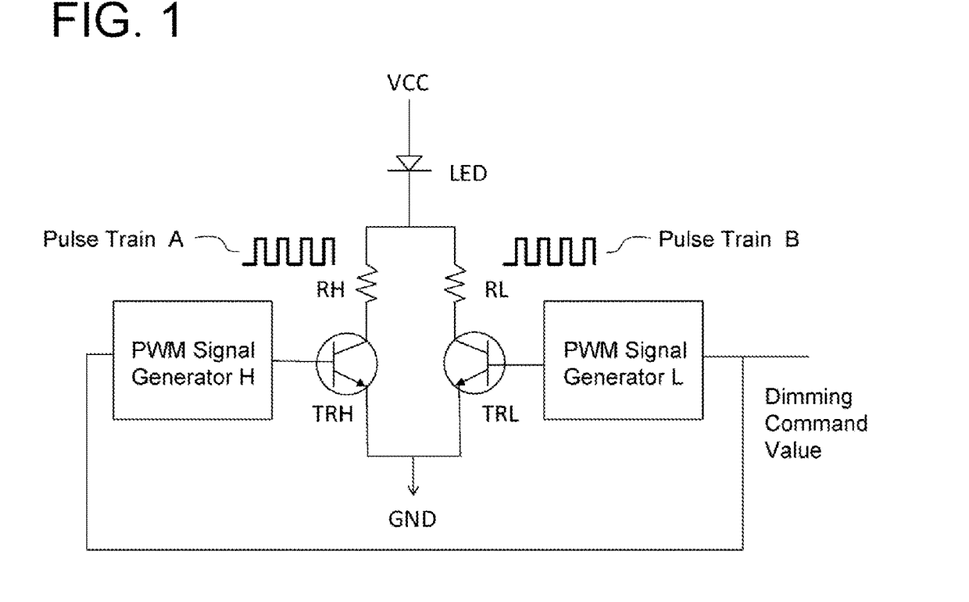
FIG. 1 is a circuit diagram illustrating an LED driver circuit according to an embodiment of the present invention.

FIG. 1 is a circuit diagram illustrating an LED driver circuit according to an embodiment of the present invention. Two driver circuits (i.e. a driver circuit including a register (hereinafter also referred to as current-limiting transistors) RH and a power transistor TRH, and a driver circuit including a resistor RL and a power transistor TRL) are connected to a light-emitting diode LED. A PWM signal generator circuit (hereinafter also referred to as a PWM signal generator) H outputs a PWM signal (pulse train A) having a certain pulse width to drive the power transistor TRH. Similarly, a PWM signal generator circuit (hereinafter also referred to as a PWM signal generator) L outputs a PWM signal (pulse train B) having a certain pulse width to drive the power transistor TRL. When the power transistor TRH is in an on-state, a current flows through the LED via the current-limiting resistor RH. When the power transistor TRL is in the on-state, a current flows through the LED via the current-limiting resistor RL. When both the power transistors TRH and TRL are in the on-state, a current that flows through the LED is equal to the sum of currents that flow through the current-limiting resistors RH and RL. The current that flows through the LED is set by the individual current-limiting resistors RH and RL.

For example, it is assumed that a power supply voltage VCC is 5V and a forward-direction voltage of the LED is 3V. In such a case, the current that flows through the current-limiting resistor RH is (5−3)/RH=2/RH, and the current that flows through the current-limiting resistor RL is (5−3)/RL=2/RL. A dimming command value has 8-bit resolution. That is, a value ranging from 0 to 255 is supplied to the PWM signal generators H and L. Each of the PWM signal generators H and L converts this dimming command value into a pulse width by using a certain conversion function stored therein and outputs the pulse width. The pulse width has 12-bit resolution. That is, the pulse width is specified by a value ranging from 0 to 4,095. When the pulse width is 0, the duty cycle is equal to 0%. When the pulse width is 4,095, the duty cycle is equal to 100%. Now, it is assumed that a resistance of the current-limiting resistor RH is 10 Ω and a resistance of the current-limiting resistor RL is 1 kΩ. In this case, the current that flows through the current-limiting resistor RH is 2/10=0.2 A, and the current that flows through the current-limiting resistor RL is 2/1,000=2 mA. A ratio between these currents is 100:1. That is, a ratio between amounts of lights to be emitted for the same pulse width given by the PWM signal generators L and H is 1:100.

Figure 2:
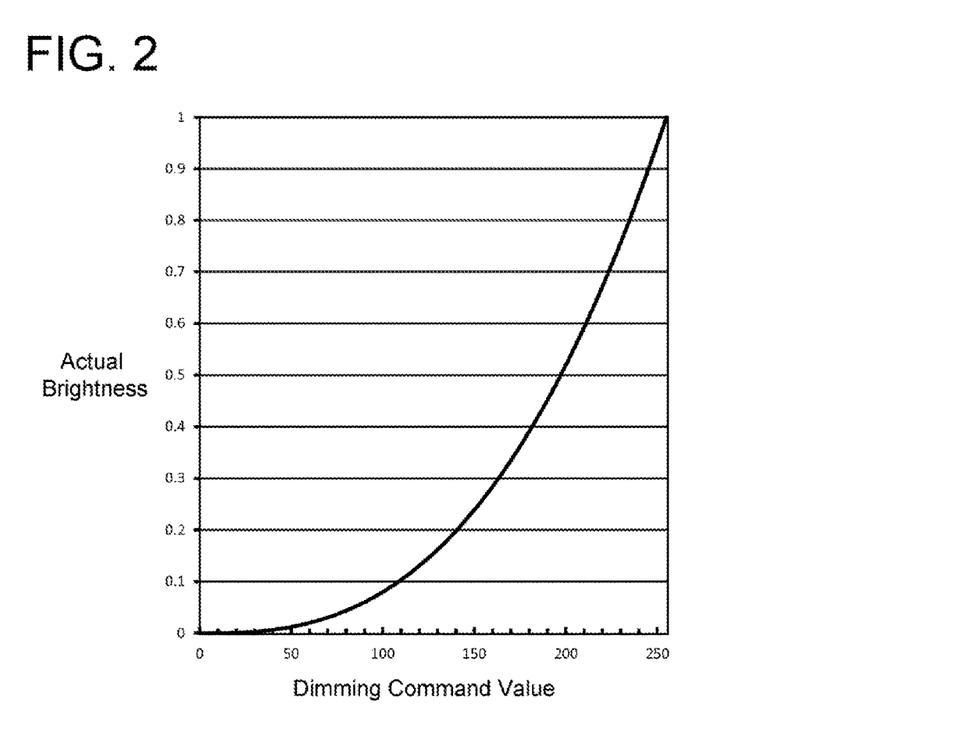
FIG. 2 is a graph illustrating characteristics of a conversion function used to obtain, for a change in a dimming command value, an actual brightness change in a wide dynamic range implemented by the circuit illustrated in FIG. 1.
Figure 3:
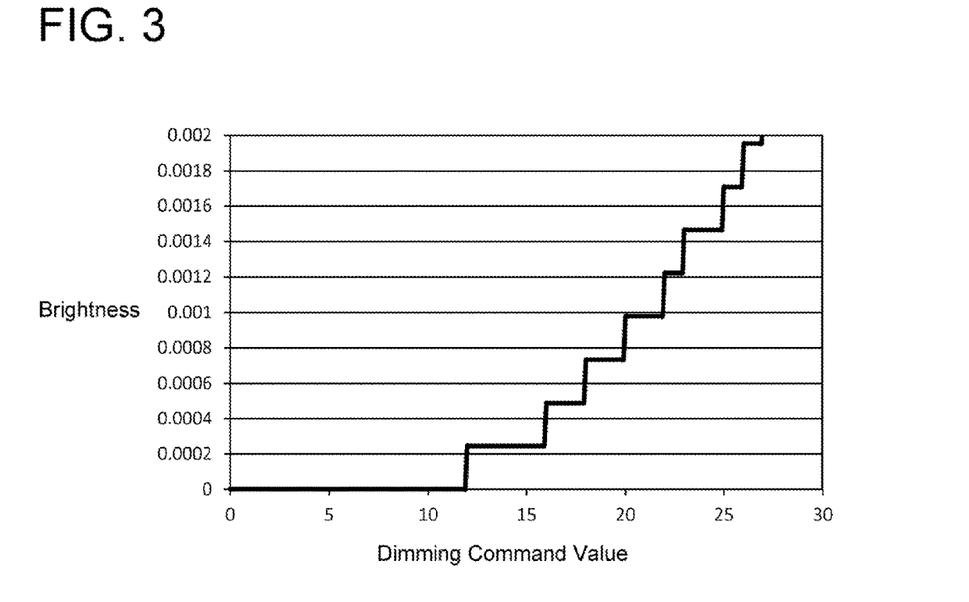
FIG. 3 is a graph illustrating an example of an actual brightness change controlled based on a change in the dimming command value, the graph being an enlarged illustration of output characteristics implemented by a PWM circuit of 12-bit resolution in a low light flux region.

A specific example of the conversion function for converting the dimming command value into the pulse width of the PWM signal will be described next. The sensitivity of the human eye is not necessarily linear. Thus, a smoother result is obtained in the case where a relationship between the dimming command value and the actual brightness is based on a certain function than in the case where the relationship is linear. For example, a function is set such that a brightness=an input raised to the power of 2.7 so as to obtain a brightness change in a wide dynamic range for a limited number of input command values denoted by 8 bits. FIG. 2 illustrates an example of this function. The dimming command value is given as an 8-bit gradation ranging from 0 to 255, whereas the output changes according to a curve of a function of the power of 2.7. FIG. 3 is an illustration obtained by enlarging output characteristics implemented, for example, by a PWM circuit of 12-bit resolution in a low light flux region. With 12-bit resolution, one step is equal to 1/4,096 of the maximum value (i.e. 1), that is, is equal to approximately 0.000244. In the case of illumination having the maximum illuminance of 100 lx, this value is equal to approximately 24 mlx. This brightness change is sufficiently noticeable as a stepped change when the eyes are adjusted to the dark.

Figure 4:
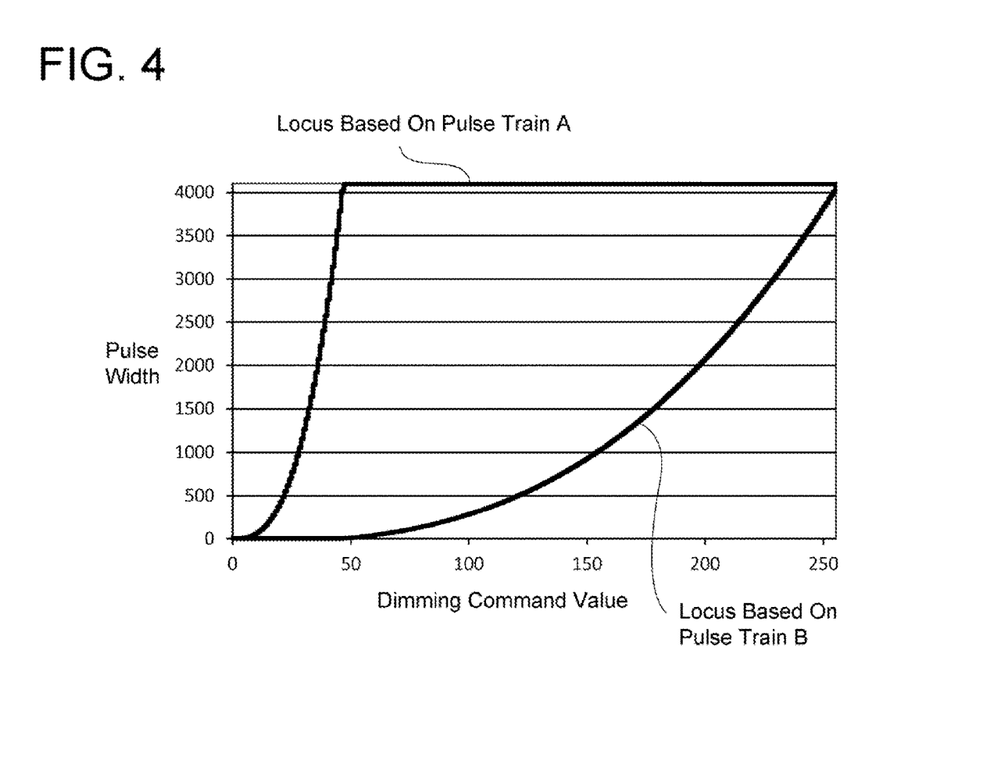
FIG. 4 is a graph illustrating examples of pulse widths respectively for PWM signal generators L and H of the circuit illustrated in FIG. 1 in response to a dimming command value.

Pulse widths respectively for the PWM signal generators L and H in the circuit illustrated in FIG. 1 are set as illustrated in FIG. 4. In a low light amount region up to the dimming command value of approximately 50, the value for the PWM signal generator L is changed. In a region of a greater light amount, the value for the PWM signal generator H is changed. When the duty for the PWM signal generator L is equal to 1, 1% of the maximum light amount is obtained. When the duties for both the PWM signal generators L and H are equal to 1, the maximum light amount is obtained. Tables 1-1 and 1-2 illustrate an example of these values. The dimming command value takes a value ranging from 0 to 255. A value PWM_L denotes a pulse width output by the PWM signal generator L and takes a 12-bit gradation value ranging from 0 to 4,095. The same applies to a value PWM_H. The brightness of the LED is denoted by (PWM_L/4,095)*0.01+(PWM_H/4,095). Tables 1-1 and 1-2 illustrate this brightness value.

TABLE 1-1

| Command Value | PWM_L | PWM_H | Brightness |
| --- | --- | --- | --- |
| 0 | 0 | 0 | 0.000000 |
| 1 | 0 | 0 | 0.000000 |
| 2 | 0 | 0 | 0.000000 |
| 3 | 2 | 0 | 0.000005 |
| 4 | 5 | 0 | 0.000012 |
| 5 | 10 | 0 | 0.000024 |
| 6 | 16 | 0 | 0.000039 |
| 7 | 24 | 0 | 0.000059 |
| 8 | 35 | 0 | 0.000085 |
| 9 | 49 | 0 | 0.000120 |
| 10 | 65 | 0 | 0.000159 |
| 11 | 84 | 0 | 0.000205 |
| 12 | 106 | 0 | 0.000259 |
| 13 | 132 | 0 | 0.000322 |
| 14 | 161 | 0 | 0.000393 |
| 15 | 195 | 0 | 0.000476 |
| 16 | 232 | 0 | 0.000567 |
| 17 | 273 | 0 | 0.000667 |
| 18 | 319 | 0 | 0.000779 |
| 19 | 369 | 0 | 0.000901 |
| 20 | 424 | 0 | 0.001035 |
| 21 | 483 | 0 | 0.001179 |
| 22 | 548 | 0 | 0.001338 |
| 23 | 618 | 0 | 0.001509 |
| 24 | 693 | 0 | 0.001692 |
| 25 | 774 | 0 | 0.001890 |
| 26 | 861 | 0 | 0.002103 |
| 27 | 953 | 0 | 0.002327 |
| 28 | 1052 | 0 | 0.002569 |
| 29 | 1156 | 0 | 0.002823 |
| 30 | 1267 | 0 | 0.003094 |
| 31 | 1384 | 0 | 0.003380 |
| 32 | 1508 | 0 | 0.003683 |
| 33 | 1639 | 0 | 0.004002 |
| 34 | 1777 | 0 | 0.004339 |
| 35 | 1921 | 0 | 0.004691 |
| 36 | 2073 | 0 | 0.005062 |
| 37 | 2232 | 0 | 0.005451 |
| 38 | 2399 | 0 | 0.005858 |
| 39 | 2573 | 0 | 0.006283 |
| 40 | 2755 | 0 | 0.006728 |
| 41 | 2945 | 0 | 0.007192 |
| 42 | 3143 | 0 | 0.007675 |
| 43 | 3350 | 0 | 0.008181 |
| 44 | 3564 | 0 | 0.008703 |
| 45 | 3787 | 0 | 0.009248 |
| 46 | 4019 | 0 | 0.009814 |
| 47 | 4095 | 1 | 0.010244 |
| 48 | 4095 | 4 | 0.010977 |
| 49 | 4095 | 6 | 0.011465 |
| 50 | 4095 | 9 | 0.012198 |
| 51 | 4095 | 12 | 0.012930 |
| 52 | 4095 | 15 | 0.013663 |
| 53 | 4095 | 17 | 0.014151 |
| 54 | 4095 | 21 | 0.015128 |
| 55 | 4095 | 24 | 0.015861 |
| 56 | 4095 | 27 | 0.016593 |
| 57 | 4095 | 30 | 0.017326 |
| 58 | 4095 | 34 | 0.018303 |
| 59 | 4095 | 37 | 0.019035 |
| 60 | 4095 | 41 | 0.020012 |
| 61 | 4095 | 45 | 0.020989 |
| 62 | 4095 | 49 | 0.021966 |
| 63 | 4095 | 52 | 0.022698 |
| 64 | 4095 | 57 | 0.023919 |
| 65 | 4095 | 61 | 0.024896 |
| 66 | 4095 | 65 | 0.025873 |
| 67 | 4095 | 69 | 0.026850 |
| 68 | 4095 | 74 | 0.028071 |
| 69 | 4095 | 79 | 0.029292 |
| 70 | 4095 | 83 | 0.030269 |
| 71 | 4095 | 88 | 0.031490 |
| 72 | 4095 | 93 | 0.032711 |
| 73 | 4095 | 98 | 0.033932 |
| 74 | 4095 | 104 | 0.035397 |
| 75 | 4095 | 109 | 0.036618 |
| 76 | 4095 | 114 | 0.037839 |
| 77 | 4095 | 120 | 0.039304 |
| 78 | 4095 | 126 | 0.040769 |
| 79 | 4095 | 132 | 0.042234 |
| 80 | 4095 | 138 | 0.043700 |
| 81 | 4095 | 144 | 0.045165 |
| 82 | 4095 | 150 | 0.046630 |
| 83 | 4095 | 156 | 0.048095 |
| 84 | 4095 | 163 | 0.049805 |
| 85 | 4095 | 169 | 0.051270 |
| 86 | 4095 | 176 | 0.052979 |
| 87 | 4095 | 183 | 0.054689 |
| 88 | 4095 | 190 | 0.056398 |
| 89 | 4095 | 197 | 0.058107 |
| 90 | 4095 | 205 | 0.060061 |
| 91 | 4095 | 212 | 0.061770 |
| 92 | 4095 | 220 | 0.063724 |
| 93 | 4095 | 227 | 0.065433 |
| 94 | 4095 | 235 | 0.067387 |
| 95 | 4095 | 243 | 0.069341 |
| 96 | 4095 | 251 | 0.071294 |
| 97 | 4095 | 260 | 0.073492 |
| 98 | 4095 | 268 | 0.075446 |
| 99 | 4095 | 277 | 0.077643 |
| 100 | 4095 | 286 | 0.079841 |
| 101 | 4095 | 294 | 0.081795 |
| 102 | 4095 | 304 | 0.084237 |
| 103 | 4095 | 313 | 0.086435 |
| 104 | 4095 | 322 | 0.088632 |
| 105 | 4095 | 332 | 0.091074 |
| 106 | 4095 | 341 | 0.093272 |
| 107 | 4095 | 351 | 0.095714 |
| 108 | 4095 | 361 | 0.098156 |
| 109 | 4095 | 371 | 0.100598 |
| 110 | 4095 | 382 | 0.103284 |
| 111 | 4095 | 392 | 0.105726 |
| 112 | 4095 | 403 | 0.108413 |
| 113 | 4095 | 413 | 0.110855 |
| 114 | 4095 | 424 | 0.113541 |
| 115 | 4095 | 436 | 0.116471 |
| 116 | 4095 | 447 | 0.119158 |
| 117 | 4095 | 458 | 0.121844 |
| 118 | 4095 | 470 | 0.124774 |
| 119 | 4095 | 482 | 0.127705 |
| 120 | 4095 | 494 | 0.130635 |
| 121 | 4095 | 506 | 0.133565 |
| 122 | 4095 | 518 | 0.136496 |
| 123 | 4095 | 530 | 0.139426 |
| 124 | 4095 | 543 | 0.142601 |
| 125 | 4095 | 556 | 0.145775 |
| 126 | 4095 | 569 | 0.148950 |
| 127 | 4095 | 582 | 0.152125 |

TABLE 1-2

| Command Value | PWM_L | PWM_H | Brightness |
| --- | --- | --- | --- |
| 128 | 4095 | 595 | 0.155299 |
| 129 | 4095 | 609 | 0.158718 |
| 130 | 4085 | 623 | 0.162137 |
| 131 | 4095 | 637 | 0.165556 |
| 132 | 4095 | 651 | 0.168974 |

TABLE 1-2-continued

| Command Value | PWM_L | PWM_H | Brightness |
|---|---|---|---|
| 133 | 4095 | 665 | 0.172393 |
| 134 | 4095 | 679 | 0.175812 |
| 135 | 4095 | 694 | 0.179475 |
| 136 | 4095 | 709 | 0.183138 |
| 137 | 4095 | 724 | 0.186801 |
| 138 | 4095 | 739 | 0.190464 |
| 139 | 4095 | 754 | 0.194127 |
| 140 | 4095 | 770 | 0.198034 |
| 141 | 4095 | 786 | 0.201941 |
| 142 | 4095 | 801 | 0.205604 |
| 143 | 4095 | 818 | 0.209756 |
| 144 | 4095 | 834 | 0.213663 |
| 145 | 4095 | 850 | 0.217570 |
| 146 | 4095 | 867 | 0.221722 |
| 147 | 4095 | 884 | 0.225873 |
| 148 | 4095 | 901 | 0.230024 |
| 149 | 4095 | 918 | 0.234176 |
| 150 | 4095 | 936 | 0.238571 |
| 151 | 4095 | 954 | 0.242967 |
| 152 | 4095 | 971 | 0.247118 |
| 153 | 4095 | 990 | 0.251753 |
| 154 | 4095 | 1008 | 0.256154 |
| 155 | 4095 | 1026 | 0.260549 |
| 156 | 4095 | 1045 | 0.265189 |
| 157 | 4095 | 1064 | 0.269829 |
| 158 | 4095 | 1083 | 0.274469 |
| 159 | 4095 | 1102 | 0.279109 |
| 160 | 4095 | 1122 | 0.283993 |
| 161 | 4095 | 1142 | 0.288877 |
| 162 | 4095 | 1162 | 0.293761 |
| 163 | 4095 | 1182 | 0.298645 |
| 164 | 4095 | 1202 | 0.303529 |
| 165 | 4095 | 1223 | 0.308657 |
| 166 | 4095 | 1244 | 0.313785 |
| 167 | 4095 | 1265 | 0.318913 |
| 168 | 4095 | 1286 | 0.324042 |
| 169 | 4095 | 1307 | 0.329170 |
| 170 | 4095 | 1329 | 0.334542 |
| 171 | 4095 | 1351 | 0.339915 |
| 172 | 4095 | 1373 | 0.345287 |
| 173 | 4095 | 1395 | 0.350659 |
| 174 | 4095 | 1418 | 0.356276 |
| 175 | 4095 | 1440 | 0.361648 |
| 176 | 4095 | 1463 | 0.367265 |
| 177 | 4095 | 1487 | 0.373126 |
| 178 | 4095 | 1510 | 0.378742 |
| 179 | 4095 | 1534 | 0.384603 |
| 180 | 4095 | 1557 | 0.390220 |
| 181 | 4095 | 1582 | 0.396325 |
| 182 | 4095 | 1606 | 0.402186 |
| 183 | 4095 | 1630 | 0.408046 |
| 184 | 4095 | 1655 | 0.414151 |
| 185 | 4095 | 1680 | 0.420256 |
| 186 | 4095 | 1705 | 0.426361 |
| 187 | 4095 | 1731 | 0.432711 |
| 188 | 4095 | 1757 | 0.439060 |
| 189 | 4095 | 1783 | 0.445409 |
| 190 | 4095 | 1809 | 0.451758 |
| 191 | 4095 | 1835 | 0.458107 |
| 192 | 4095 | 1862 | 0.464701 |
| 193 | 4095 | 1889 | 0.471294 |
| 194 | 4095 | 1916 | 0.477888 |
| 195 | 4095 | 1943 | 0.484481 |
| 196 | 4095 | 1971 | 0.491319 |
| 197 | 4095 | 1999 | 0.498156 |
| 198 | 4095 | 2027 | 0.504994 |
| 199 | 4095 | 2055 | 0.511832 |
| 200 | 4095 | 2084 | 0.518913 |
| 201 | 4095 | 2112 | 0.525751 |
| 202 | 4095 | 2142 | 0.533077 |
| 203 | 4095 | 2171 | 0.540159 |
| 204 | 4095 | 2200 | 0.547241 |
| 205 | 4095 | 2230 | 0.554567 |
| 206 | 4095 | 2260 | 0.561893 |
| 207 | 4095 | 2290 | 0.569219 |
| 208 | 4095 | 2321 | 0.576789 |
| 209 | 4095 | 2352 | 0.584359 |
| 210 | 4095 | 2383 | 0.591929 |
| 211 | 4095 | 2414 | 0.599499 |
| 212 | 4095 | 2446 | 0.607314 |
| 213 | 4095 | 2478 | 0.615128 |
| 214 | 4095 | 2510 | 0.622943 |
| 215 | 4095 | 2542 | 0.630757 |
| 216 | 4095 | 2574 | 0.638571 |
| 217 | 4095 | 2607 | 0.646630 |
| 218 | 4095 | 2640 | 0.654689 |
| 219 | 4095 | 2674 | 0.662991 |
| 220 | 4095 | 2707 | 0.671050 |
| 221 | 4095 | 2741 | 0.679353 |
| 222 | 4095 | 2775 | 0.687656 |
| 223 | 4095 | 2810 | 0.696203 |
| 224 | 4095 | 2844 | 0.704505 |
| 225 | 4095 | 2879 | 0.713053 |
| 226 | 4095 | 2914 | 0.721600 |
| 227 | 4095 | 2950 | 0.730391 |
| 228 | 4095 | 2986 | 0.739182 |
| 229 | 4095 | 3022 | 0.747973 |
| 230 | 4095 | 3058 | 0.756764 |
| 231 | 4095 | 3094 | 0.765556 |
| 232 | 4095 | 3131 | 0.774591 |
| 233 | 4095 | 3168 | 0.783626 |
| 234 | 4085 | 3206 | 0.792906 |
| 235 | 4095 | 3243 | 0.801941 |
| 236 | 4095 | 3281 | 0.811221 |
| 237 | 4095 | 3319 | 0.820501 |
| 238 | 4095 | 3358 | 0.830024 |
| 239 | 4095 | 3396 | 0.839304 |
| 240 | 4095 | 3435 | 0.848828 |
| 241 | 4095 | 3474 | 0.858352 |
| 242 | 4095 | 3514 | 0.868120 |
| 243 | 4095 | 3554 | 0.877888 |
| 244 | 4095 | 3594 | 0.887656 |
| 245 | 4095 | 3634 | 0.897424 |
| 246 | 4095 | 3675 | 0.907436 |
| 247 | 4095 | 3716 | 0.917448 |
| 248 | 4095 | 3757 | 0.927460 |
| 249 | 4095 | 3799 | 0.937717 |
| 250 | 4095 | 3840 | 0.947729 |
| 251 | 4095 | 3882 | 0.957985 |
| 252 | 4095 | 3925 | 0.968486 |
| 253 | 4095 | 3967 | 0.978742 |
| 254 | 4095 | 4010 | 0.989243 |
| 255 | 4095 | 4054 | 0.999988 |

Figure 5:
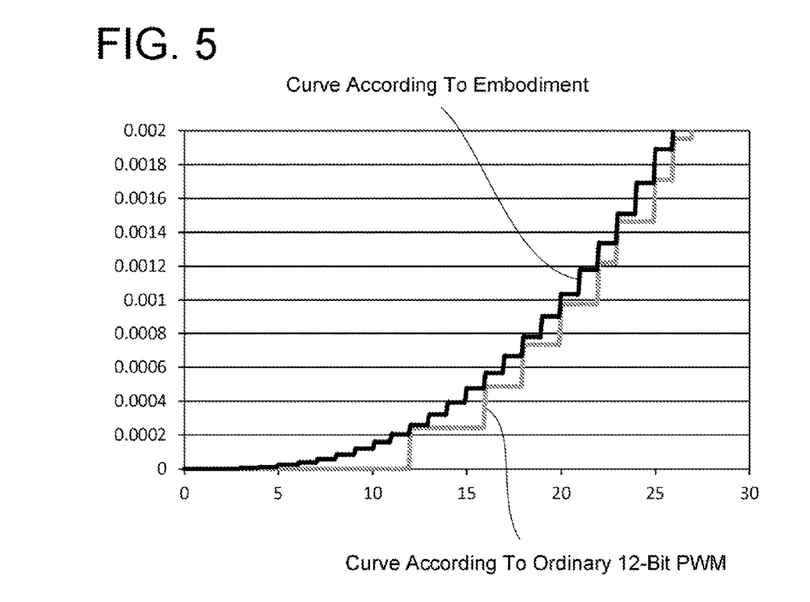
FIG. 5 is a graph illustrating an example of an actual brightness change controlled based on a change in the dimming command value, the graph being obtained by superimposing the value of the graph in FIG. 4 on the value in FIG. 3.

FIG. 5 is obtained by superimposing this value on the value in FIG. 3. Dimming is implemented even at a low amount of light much smoother than that denoted by the curve of ordinary 12-bit PWM. In addition, dimming is performed using the pulse width PWM_H at and above a certain amount of light. Because there is already a certain amount of light in that range, the stepped brightness change is unobtrusive even at the dimming resolution of the pulse width PWM_H. An actual dynamic range is calculated. The minimum luminance obtained based on the pulse width PWM_L is $1/4,096/100 = 2.44 \times 10^{-6}$, and the dynamic range is 409,600. Because the dynamic range of ordinary 12-bit PWM is 4,096, a resolution that is 100 times as high as that of ordinary 12-bit PWM is achieved. This embodiment has described the example where two PWM circuits are used and a ratio between current values is set to 100, however a configuration using three or more PWM circuits is also possible. In such a case, the dynamic range can be increased further by 100 times, and the constraint is substantially removed.

Figure 6:
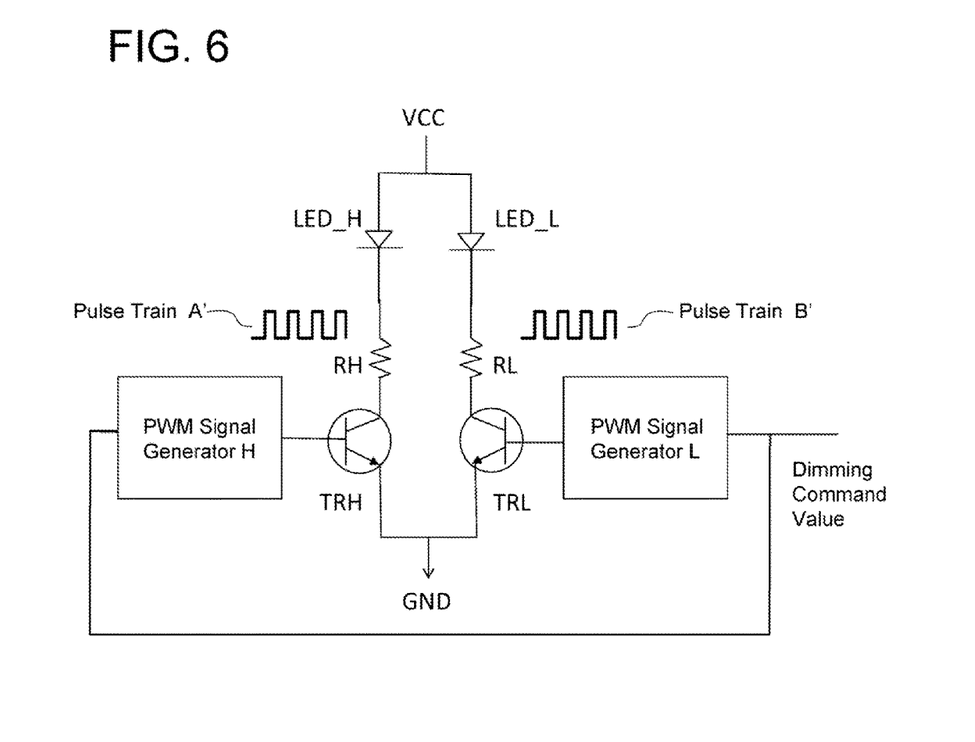
FIG. 6 is a circuit diagram of an LED driver circuit according to another embodiment of the present invention and illustrates an example in which a PWM_H circuit and a PWM_L circuit are assigned to different LEDs.

FIG. 6 illustrates an embodiment in which PWM circuits are assigned to different LEDs. An LED LED_H is switched on based on a PWM signal generated by the PWM signal generator H. An LED LED_L is switched on based on a PWM signal generated by the PWM signal generator L. In this case, because the brightness of both the LEDs LED_H and LED_L are changed, the brightness can be changed not only by changing the values of the current-limiting resistors but also by changing the number of lamps or models actually used in the LEDs LED_H and LED_L or the presence or absence of an optical filter. Also, in this embodiment, the brightness is controlled by setting pulse trains A' and B' to have a relationship between the dimming command value and the pulse width illustrated in FIG. 4.

Figure 7:
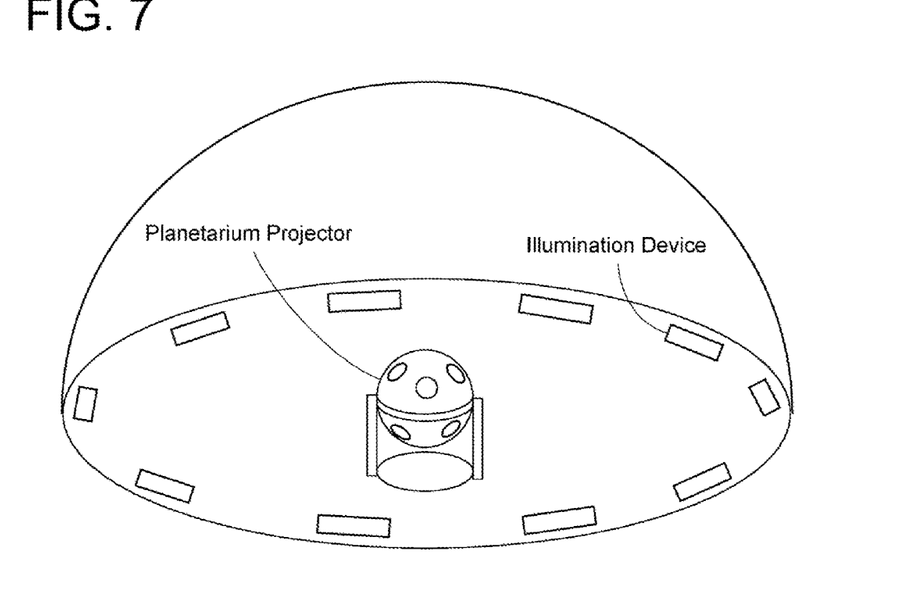
FIG. 7 is a diagram illustrating an overview of a planetarium apparatus that uses illumination devices each including the LED driver circuit according to the embodiments of the present invention.
Figure 8:
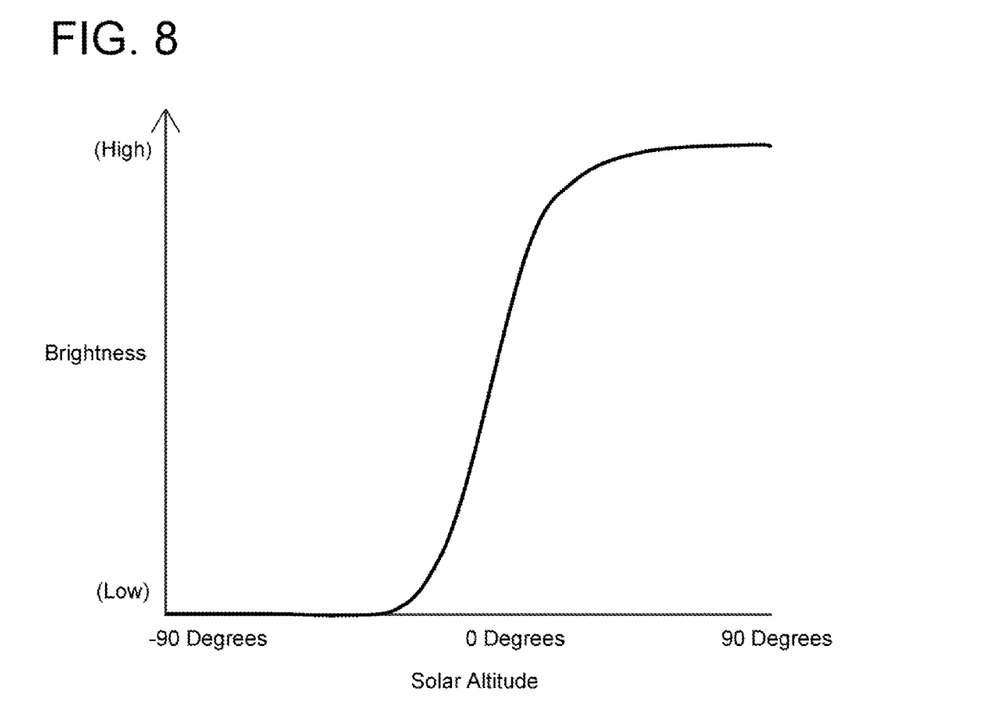
FIG. 8 is a graph illustrating an example of a brightness change controlled based on a change in the solar altitude in the case where the illumination devices illustrated in FIG. 7 are automatically controlled.

FIG. 7 illustrates an embodiment in which illumination devices produced based on this circuitry are used at a planetarium. The illumination devices each including an LED and a driver circuit are installed at a periphery of a dome screen so as to illuminate the entire dome screen. The brightness of the illumination devices are controlled by manual operation performed by a presenter or automatically controlled by a control system at the planetarium. FIG. 8 illustrates an example of a relationship of the brightness against a change in the solar altitude used in the case of automatic control. The planetarium control system stores therein a real-time solar altitude. The planetarium control system calculates a brightness based on the graph illustrated in FIG. 8 by using this altitude and sends the calculated brightness value to the illumination devices as a command input, thereby being able to reproduce a change between daytime and nighttime. The use of the circuit according to the embodiments of the present invention allows a subtle brightness change of the night sky during a very dim time period after sunset to be reproduced naturally.

With the embodiments of the present invention, LEDs can be smoothly dimmed further from an extremely low illuminance, without increasing the PWM frequency unnecessarily. In the case where the resolution is increased by increasing the number of bits used for PWM control, current needs to be switched at an extremely high speed in order to implement the small pulse width, causing issues related to stability of the circuit and occurrence of noise. In contrast, the method according to the embodiments of the present invention enables smooth dimming even at low illuminance through PWM control using a small number of bits.

The embodiments above have described the case where one LED is used and the case where two LEDs are used respectively for a low illuminance region and a high illuminance region, however the advantageous effects of the embodiments of the present invention are also exerted even in the case where an LED is further inserted in series to circuit portions each including an LED. In addition, the example of using resistors to limit the current has been described, however currents at two PWM circuits on the PWM signal generator H side and the PWM signal generator L side can be limited to be different current values by using constant-current diodes instead of the resistors. Further, the example case of setting the ratio between the two current values to 100 has been described, however the ratio may be less than or greater than 100.

What is claimed is:

1. An LED driver circuit comprising:
a plurality of driver circuits connected to an LED, the plurality of driver circuits including:
a plurality of current-limiting circuits for which currents that flow therethrough are certain current set values that are different from one another; and
a plurality of pulse width modulation circuits,
wherein the LED driver circuit is configured to:
mainly control a pulse width for a current-limiting circuit having a small current set value, among the plurality of current-limiting circuits, in a low light amount region, thereby when a dimming command value takes a value ranging from 0 or a minimum value to a certain value, a bit gradation value of a pulse width for a pulse width modulation circuit is changed to a maximum bit gradation value of the pulse width in a locus based on a certain inclination, and
mainly control a pulse width for a current-limiting circuit having a large current set value, among the plurality of current-limiting circuits, in a high light amount region, thereby when the dimming command value takes a value not less than the certain value, a bit gradation value of a pulse width for a pulse width modulation circuit is changed to an approximate maximum bit gradation value of the pulse width in the locus based on a gentle inclination in comparison to the certain inclination,
whereby an amount of light of the LED is smoothly changed in a wider dynamic range than in the case of using a single driver circuit.

2. The LED driver circuit according to claim 1, wherein the plurality of driver circuits comprises two driver circuits, and each of the current-limiting circuits in the two driver circuits is connected to a corresponding one of LEDs.

3. The LED driver circuit according to claim 1, wherein the plurality of driver circuits comprises two driver circuits, and the two driver circuits are connected in parallel to one another and are connected in common to the LED.

4. The LED driver circuit according to claim 1, wherein the current-limiting circuit is a resister.

5. The LED driver circuit according to claim 1, wherein the current-limiting circuit is a constant-current diode.

6. An LED driver circuit used in an illumination device that illuminates background on a dome screen at a planetarium, the LED driver circuit comprising:
a plurality of driver circuits connected to an LED, the plurality of driver circuits including:
a plurality of current-limiting circuits for which currents that flow therethrough are certain current set values that are different from one another; and
a plurality of pulse width modulation circuits,
wherein the LED driver circuit is configured to:
mainly control a pulse width for a current-limiting circuit having a small current set value, among the plurality of current-limiting circuits, in a low light amount region, thereby when a dimming command value takes a value ranging from 0 or a minimum value to a certain value, a bit gradation value of a pulse width for a pulse width modulation circuit is changed to a maximum bit gradation value of the pulse width in a locus based on a certain inclination, and
mainly control a pulse width for a current-limiting circuit having a large current set value, among the plurality of current-limiting circuits, in a high light amount region, thereby when the dimming command value takes a value not less than the certain value, a bit gradation value of a pulse width for a pulse width modulation circuit is changed to a maximum bit gradation value of the pulse width in the locus based on a gentle inclination in comparison to a certain inclination,
whereby an amount of light of the LED is smoothly changed in a wider dynamic range than in a case of using a single driver circuit.

7. The LED driver circuit according to claim 6, wherein the plurality of driver circuits comprises two driver circuits, and each of the current-limiting circuits in the two driver circuits is connected to a corresponding one of LEDs.

8. The LED driver circuit according to claim 6, wherein the plurality of driver circuits comprises two driver circuits, and the two driver circuits are connected in parallel to one another and are connected in common to the LED.

9. The LED driver circuit according to claim 6, wherein a plurality of the illumination devices are provided along the inside of a dome screen at the planetarium.

10. The LED driver circuit according to claim 6, wherein a brightness of the illumination device is controlled by manual operation or is automatically controlled by a control system at the planetarium.

11. The LED driving circuit according to claim 6, wherein a control system at the planetarium stores a real-time solar altitude, calculates the brightness on the basis of the solar altitude, and sends a command input based on the calculated brightness to the illumination device to reproduce a change between daytime and nighttime.

* * * * *